(12) United States Patent
Trepess et al.

(10) Patent No.: US 7,668,853 B2
(45) Date of Patent: Feb. 23, 2010

(54) INFORMATION STORAGE AND RETRIEVAL

(75) Inventors: David William Trepess, Basingstoke (GB); Jonathan Richard Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 193 days.

(21) Appl. No.: 10/723,422

(22) Filed: Nov. 25, 2003

(65) Prior Publication Data

US 2004/0139105 A1 Jul. 15, 2004

(30) Foreign Application Priority Data

Nov. 27, 2002 (GB) ................................ 0227658.2

(51) Int. Cl.
G06F 17/00 (2006.01)
G06F 7/00 (2006.01)
(52) U.S. Cl. .................. 707/102; 707/1; 707/104.1; 707/3; 707/5; 715/848
(58) Field of Classification Search .............. 707/104.1, 707/10, 102, 104, 3, 7, 5, 2, 1; 725/116; 704/9
See application file for complete search history.

(56) References Cited

U.S. PATENT DOCUMENTS

| | | | |
|---|---|---|---|
| 5,544,352 A | | 8/1996 | Egger |
| 5,754,938 A | * | 5/1998 | Herz et al. .................. 725/116 |
| 5,794,178 A | | 8/1998 | Caid et al. |
| 5,877,766 A | | 3/1999 | Bates et al. |
| 5,963,965 A | | 10/1999 | Vogel |
| 5,983,237 A | * | 11/1999 | Jain et al. ................. 707/104.1 |
| 5,987,460 A | | 11/1999 | Niwa et al. |
| 5,995,978 A | | 11/1999 | Cullen et al. |
| 6,088,804 A | | 7/2000 | Hill et al. |
| 6,493,705 B1 | * | 12/2002 | Kobayashi et al. ............. 707/3 |

(Continued)

FOREIGN PATENT DOCUMENTS

EP 0 967 557 A2 12/1999

(Continued)

OTHER PUBLICATIONS

Kohonen et al. (NPL:"Self Organization of Massive Document Collection", IEEE, May 2000).*

(Continued)

Primary Examiner—Jean B. Fleurantin
Assistant Examiner—Giovanna Colan
(74) Attorney, Agent, or Firm—Oblon, Spivak, McClelland, Maier & Neustadt, L.L.P.

(57) ABSTRACT

An information retrieval system in which a set of distinct information items map to respective nodes in an array of nodes by mutual similarity of the information items, so that similar information items map to nodes at similar positions in the array of nodes; the system comprising: a user control for defining a search criterion for selecting information items; a detector for detecting those positions within the array of nodes corresponding to the selected information items; a graphical user interface for displaying a two-dimensional display array of display points representing those positions within the array of nodes corresponding to the selected information items; and a processor responsive to the selected information items, for providing a representation which is generally representative of the information content of the selected information items.

35 Claims, 10 Drawing Sheets

U.S. PATENT DOCUMENTS

| | | | |
|---|---|---|---|
| 6,629,097 B1* | 9/2003 | Keith | 707/5 |
| 6,766,316 B2* | 7/2004 | Caudill et al. | 707/3 |
| 6,782,395 B2* | 8/2004 | Labelle | 707/104.1 |
| 6,847,966 B1* | 1/2005 | Sommer et al. | 707/5 |
| 6,959,303 B2* | 10/2005 | Rajasekaran et al. | 707/102 |
| 7,031,909 B2* | 4/2006 | Mao et al. | 704/9 |
| 2002/0069218 A1 | 6/2002 | Sull et al. | |
| 2002/0138487 A1* | 9/2002 | Weiss et al. | 707/10 |
| 2003/0093395 A1* | 5/2003 | Shetty et al. | 707/1 |

FOREIGN PATENT DOCUMENTS

| | | |
|---|---|---|
| EP | 1 202 187 | 5/2002 |
| JP | 07-121568 | 5/1995 |
| JP | 2000-57173 | 2/2000 |
| JP | 2002-132831 | 5/2002 |
| WO | WO 02/065339 A1 | 8/2002 |
| WO | WO 03/012713 | 2/2003 |

OTHER PUBLICATIONS

Qing Qian, et al., "Document Browsing and Retrival based on 3D Self-Organizing Map", IPSJSIG Notes, Information Processing Society of Japan, vol. 95, No. 65, Jul. 20, 1995, pp. 41-48 (with English Translation).*

Qing Qian, et al., "Document Browsing and Retrieval based on 3D Self-Organizing Map", IPSJSIG Notes, Information Processing Society of Japan, vol. 95, No. 65, Jul. 20, 1995, pp. 41-48 (with English Translation).

Susumu Endo, et al. "Miracles: Multimedia information retrieval system integrating visual search with textual search" Proceedings of Symposium on Database and Web Information System (DBweb2001), Information Processing Society of Japan, Dec. 5, 2001, vol. 2001-17, pp. 249-256 and 3 back pages.

"Self-organizing map browser for database retrieval", Kerminen et al., 6th ERCIM Workshop, "User Interfaces for All", Oct. 25-26, 2000.

Kohonen et al: "Self Organization of a Massive Document Collection" IEEE Transactions on Neural Networks, vol. 11, No. 3, May 1, 2000, pp. 574-585, XP002335046.

Arita, Yasui, and Tsudaka, "Information Strolling through Automatically Organized Information Space," IEICE Technical Report, Japan, The Institue of Electronics, Information an Communication Engineers, Jul. 20, 1995, vol. 95, No. 168, pp. 69-74 (NLC95-17).

Kamibayashi and Arikawa, "An Overview Function on Pictorial Databases and its Realization," IPSJ SIG Technical Reports, Japan, Information Processing Society of Japan, Jul. 21, 1986, vol. 86, No. 48, pp. 1-8 (86-DB-54-10).

Uehara, Endo, Sashida, Masumoto, and Tanahashi, "Miracles: Multimedia Information Retrieval, Classification, an Exploration System -Application to Web Document Retrieval-," lEICE Technical Report, Japan, The Institue of Electronic, Information an Communciation Engineers, May 2, 2000, vol. 100, No. 31, pp. 17-24, (DE2000-3).

* cited by examiner

| | |
|---|---|
| 0 | 0 |
| 0 | 0 |
| 0 | 3 |
| 0 | 0 |
| 1 | 1 |
| 0 | 0 |
| 0 | 7 |
| 0 | 0 |
| 0 | 0 |
| 2 | 2 |
| . | |
| . | Fig. 4b |
| . | |
| 0 | |
| 0 | |
| 0 | |
| 0 | |
| 3 | |

INFORMATION STORAGE AND RETRIEVAL

BACKGROUND OF THE INVENTION

1. Field of the Invention

This invention relates to information storage and retrieval.

2. Description of the Prior Art

There are many established systems for locating information (e.g. documents, images, emails, patents, internet content or media content such as audio/video content) by searching under keywords. Examples include internet search "engines" such as those provided by "Google" ™ or "Yahoo" ™ where a search carried out by keyword leads to a list of results which are ranked by the search engine in order of perceived relevance.

However, in a system encompassing a large amount of content, often referred to as a massive content collection, it can be difficult to formulate effective search queries to give a relatively short list of search "hits". For example, at the time of preparing the present application, a Google search on the keywords "massive document collection" drew 243000 hits. This number of hits would be expected to grow if the search were repeated later, as the amount of content stored across the internet generally increases with time. Reviewing such a list of hits can be prohibitively time-consuming.

In general, some reasons why massive content collections are not well utilised are:
- a user doesn't know that relevant content exists
- a user knows that relevant content exists but does not know where it can be located
- a user knows that content exists but does not know it is relevant
- a user knows that relevant content exists and how to find it, but finding the content takes a long time The paper "Self Organisation of a Massive Document Collection", Kohonen et al, IEEE Transactions on Neural Networks, Vol 11, No. 3, May 2000, pages 574-585 discloses a technique using so-called "self-organising maps" (SOMs). These make use of so-called unsupervised self-learning neural network algorithms in which "feature vectors" representing properties of each document are mapped onto nodes of a SOM.

In the Kohonen et al paper, a first step is to pre-process the document text, and then a feature vector is derived from each pre-processed document. In one form, this may be a histogram showing the frequencies of occurrence of each of a large dictionary of words. Each data value (i.e. each frequency of occurrence of a respective dictionary word) in the histogram becomes a value in an n-value vector, where n is the total number of candidate words in the dictionary (43222 in the example described in this paper). Weighting may be applied to the n vector values, perhaps to stress the increased relevance or improved differentiation of certain words.

The n-value vectors are then mapped onto smaller dimensional vectors (i.e. vectors having a number of values m (500 in the example in the paper) which is substantially less than n. This is achieved by multiplying the vector by an (n×m) "projection matrix" formed of an array of random numbers. This technique has been shown to generate vectors of smaller dimension where any two reduced-dimension vectors have much the same vector dot product as the two respective input vectors. This vector mapping process is described in the paper "Dimensionality Reduction by Random Mapping: Fast Similarity Computation for Clustering", Kaski, Proc IJCNN, pages 413-418, 1998.

The reduced dimension vectors are then mapped onto nodes (otherwise called neurons) on the SOM by a process of multiplying each vector by a "model" (another vector). The models are produced by a learning process which automatically orders them by mutual similarity onto the SOM, which is generally represented as a two-dimensional grid of nodes. This is a non-trivial process which took Kohonen et al six weeks on a six-processor computer having 800 MB of memory, for a document database of just under seven million documents. Finally the grid of nodes forming the SOM is displayed, with the user being able to zoom into regions of the map and select a node, which causes the user interface to offer a link to an internet page containing the document linked to that node.

The paper by Kohonen discloses the use of labels in the map to provide guidance to the exploration of the map. The labels are automatically generated, by a method of selecting keywords. The method is described in the paper "K. Lagus and S. Laski, Keyword selection method for characterising text document maps, in Proc ICANN99, Ninth Int. Conf. Artificial Neural Networks, vol. 1 1999, pp 371 to 376.

SUMMARY OF THE INVENTION

One aspect of the present invention seeks to provide representations of information items which are relevant to a particular search made by a user so as to assist the user.

One aspect of the present invention provides an information retrieval system in which a set of distinct information items map to respective nodes in an array of nodes by mutual similarity of the information items, so that similar information items map to nodes at similar positions in the array of nodes; the system comprising:

a user control for defining a search criterion for selecting information items;

a detector for detecting those positions within the array of nodes corresponding to the selected information items;

a graphical user interface for displaying display points representing those positions within the array of nodes corresponding to the selected information items; and a processor, responsive to the selected information items defined by the search criterion, for providing one or more representations representative of the information content of the selected information items.

Thus the system provides both display points which are relevant to a search of defined by the user and representations of information items defined by the search; thereby assisting the user.

In an embodiment, the said user control comprises: search means for carrying out a search of the information items; the search means and the graphical user interface being arranged to co-operate so that only those display points corresponding to information items selected by the search are displayed on the user display.

In an embodiment of the system, the processor is operable to provide the said representation(s) on the user display as a label of the display points corresponding to the selected information items. In an embodiment, the label is a word or set of words.

In another embodiment, the information items are at least associated with image items, and the processor is responsive to the selected information items, for providing an image item representing the information content of the selected information items. Preferably, the said processor is operable to select, from the set of image items, an image item which is representative of the selected image items as a whole according to a predetermined selection criterion. Furthermore, the processor may be operable to select the image item a property of which is nearest to the average of the same property of the said set of image items. The selected image item may be applied as a label on display to the display points corresponding to information items represented by the image item.

The graphical user interface preferably displays a two dimensional array of the said display points. However, a one dimensional array could be displayed or a three dimensional array could be displayed. The third dimension of the three dimensional array could be time According to another aspect of the invention, there is provided an information retrieval method in which a set of distinct information items map to respective nodes in an array of nodes by mutual similarity of the information items, so that similar information items map to nodes at similar positions in the array of nodes; the method comprising the steps of:

defining a search criterion for selecting information items;

detecting those positions within the array of nodes corresponding to the selected information items;

displaying at least display points which are at positions representing those positions within the array of nodes corresponding to the selected information items; and in response to the selected information items defined by the search criterion, providing one or more representations representative of the information content of the selected information items.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
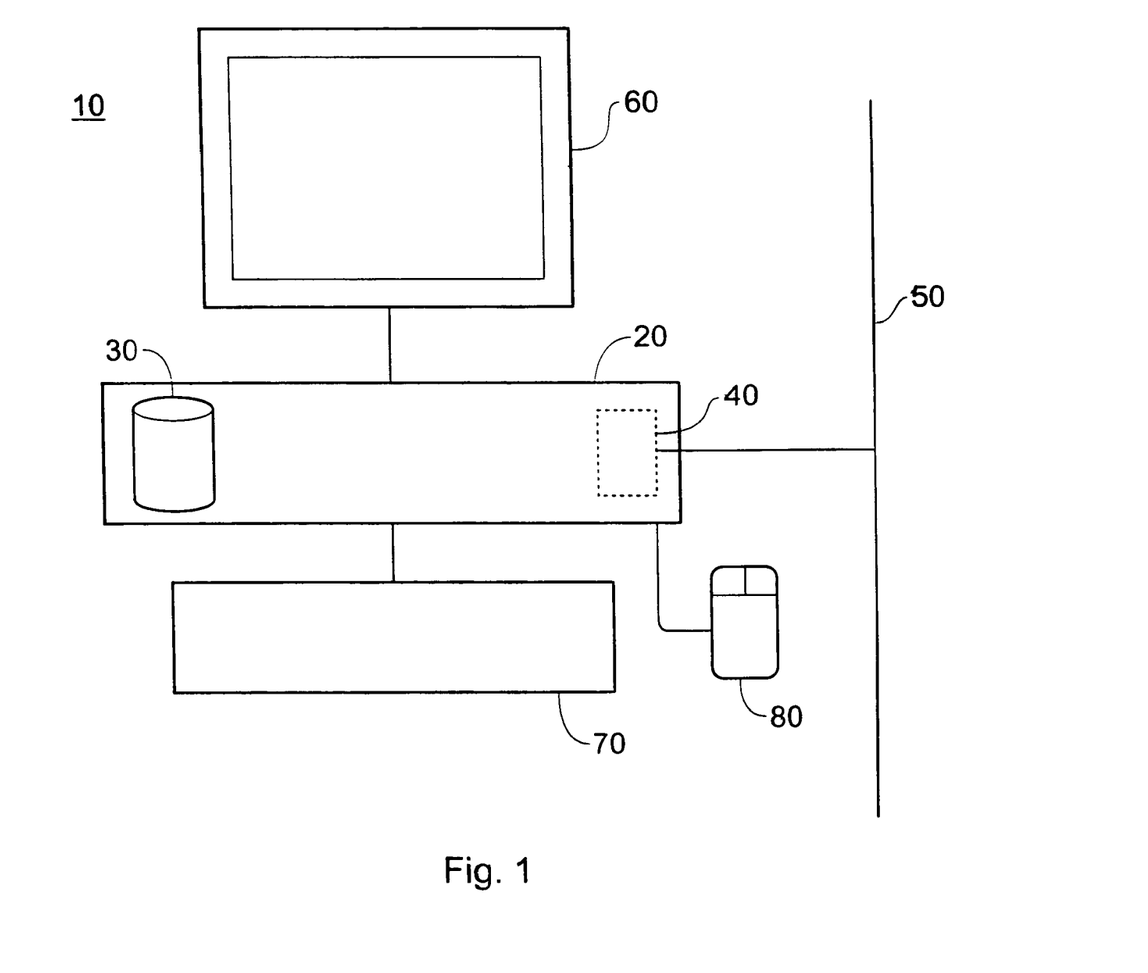
FIG. 1 schematically illustrates an information storage and retrieval system.

FIG. 1 is a schematic diagram of an information storage and retrieval system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

The storage system operates in two general modes of operation. In a first mode, a set of information items (e.g. textual information items) is assembled on the disk storage 30 or on a network disk drive connected via the network 50 and is sorted and indexed ready for a searching operation. The second mode of operation is the actual searching against the indexed and sorted data.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to textual information items. The textual information items may be associated with, or linked to, non-textual items. So, for example, audio and/or video material may be associated with "MetaData" which is a textual information item defining that material in textual terms.

The information items are loaded onto the disk storage 30 in a conventional manner. Preferably, they are stored as part of a database structure which allows for easier retrieval and indexing of the items, but this is not essential. Once the information and items have been so stored, the process used to arrange them for searching is shown schematically in FIG. 2.

It will be appreciated that the indexed information items need not be stored on the local disk drive 30. The information items could be stored on a remote drive connected to the system 10 via the network 50. Alternatively, information may be stored in a distributed manner, for example at various sites across the internet. If the information is stored at different internet or network sites, a second level of information storage could be used to store locally a "link" (e.g. a URI-universal resource identifier) to the remote information, perhaps with an associated summary, abstract or MetaData associated with that link. So, the remotely held information would not be accessed unless the user selected the relevant link (e.g. from the results list 260 to be described below), although for the purposes of the technical description which follows, the remotely held information, or the abstract/summary/MetaData, or the link/URI could be considered as the "information item".

In other words, a formal definition of the "information item" is an item from which a feature vector is derived and processed (see below) to provide a mapping to the SOM. The data shown in the results list 260 (see below) may be the actual information item which a user seeks (if it is held locally and is short enough for convenient display) or may be data representing and/or pointing to the information item, such as one or more of MetaData, a URI, an abstract, a set of key words, a representative key stamp image or the like. This is inherent in the operation "list" which often, though not always, involves listing data representing a set of items.

In a further example, the information items could be stored across a networked work group, such as a research team or a legal firm. A hybrid approach might involve some information items stored locally and/or some information items stored across a local area network and/or some information items stored across a wide area network. In this case, the system could be useful in locating similar work by others, for example in a large multi-national research and development organisation, similar research work would tend to be mapped to similar output nodes in the SOM (see below). Or, if a new television programme is being planned, the present technique could be used to check for its originality by detecting previous programmes having similar content.

It will also be appreciated that the system 10 of FIG. 1 is but one example of possible systems which could use the indexed information items. Although it is envisaged that the initial (indexing) phase would be carried out by a reasonably powerful computer, most likely by a non-portable computer, the later phase of accessing the information could be carried out at a portable machine such as a "personal digital assistant" (a term for a data processing device with display and user input devices, which generally fits in one hand), a portable computer such as a laptop computer, or even devices such as a mobile telephone, a video editing apparatus or a video camera. In general, practically any device having a display could be used for the information-accessing phase of operation.

The processes are not limited to particular numbers of information items.

Figure 2:
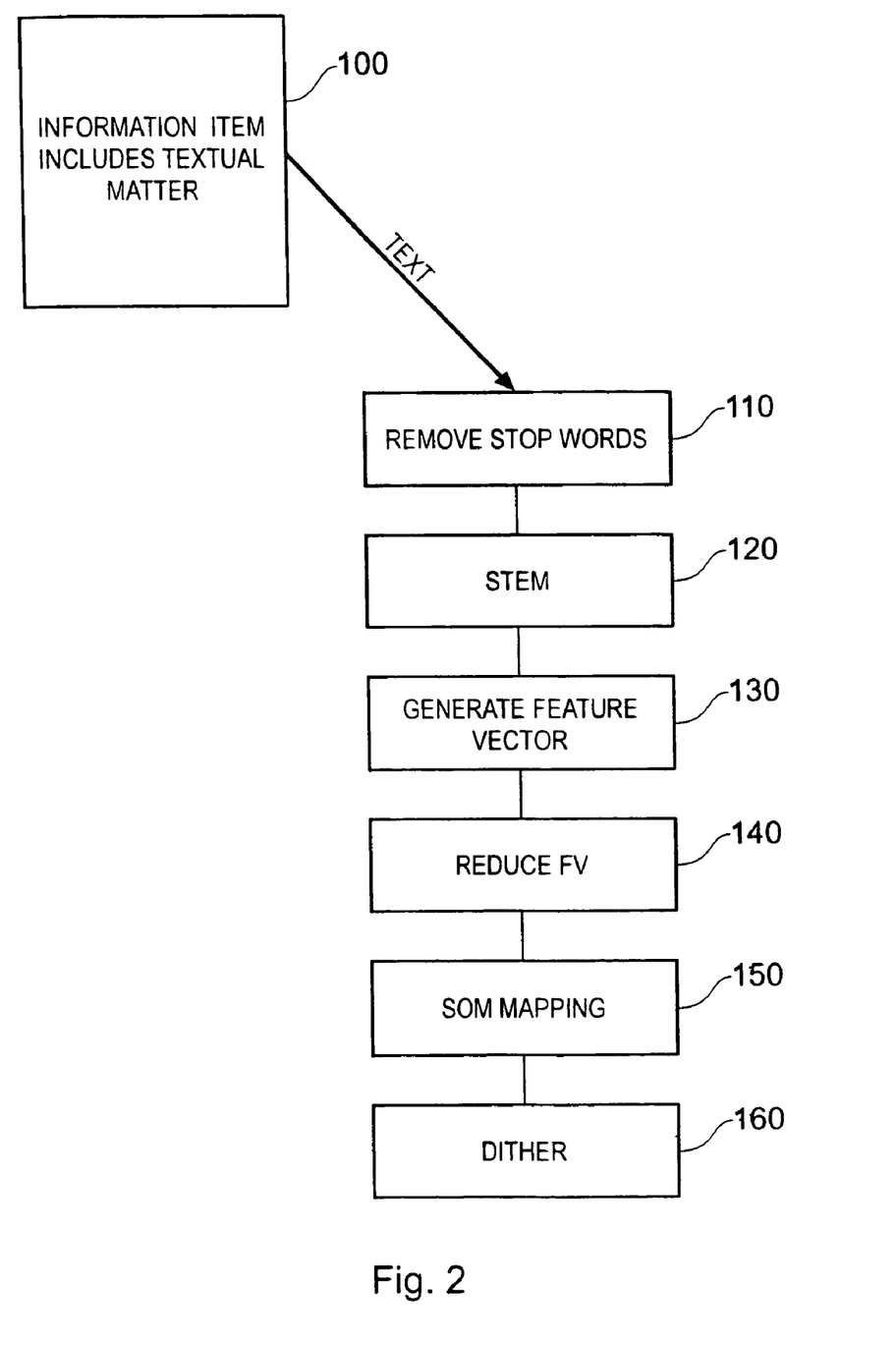
FIG. 2 is a schematic flow chart showing the generation of a self-organising map (SOM)

The process of generating a self-organising map (SOM) representation of the information items will now be described with reference to FIGS. 2 to 6. FIG. 2 is a schematic flow chart illustrating a so-called "feature extraction" process followed by an SOM mapping process.

Feature extraction is the process of transforming raw data into an abstract representation. These abstract representations can then be used for processes such as pattern classification, clustering and recognition. In this process, a so-called "feature vector" is generated, which is an abstract representation of the frequency of terms used within a document.

The process of forming the visualisation through creating feature vectors includes:

Create "document database dictionary" of terms
Create "term frequency histograms" for each individual document based on the "document database dictionary"
Reduce the dimension of the "term frequency histogram" using random mapping
Create a 2-dimensional visualisation of the information space.

Considering these steps in more detail, each document (information item) 100 is opened in turn. At a step 110, all "stop words" are removed from the document. Stop-words are extremely common words on a pre-prepared list, such as "a", "the", "however", "about", "and", and "the". Because these words are extremely common they are likely, on average, to appear with similar frequency in all documents of a sufficient length. For this reason they serve little purpose in trying to characterise the content of a particular document and should therefore be removed.

After removing stop-words, the remaining words are stemmed at a step 120, which involves finding the common stem of a word's variants. For example the words "thrower", "throws", and "throwing" have the common stem of "throw".

A "dictionary" of stemmed words appearing in the documents (excluding the "stop" words) is maintained. As a word is newly encountered, it is added to the dictionary, and running count of the number of times the word has appeared in the whole document collection (set of information items) is also recorded.

The result is a list of terms used in all the documents in the set, along with the frequency with which those terms occur. Words that occur with too high or too low a frequency are discounted, which is to say that they are removed from the dictionary and do not take part in the analysis which follows. Words with too low a frequency may be misspellings, made up, or not relevant to the domain represented by the document set. Words that occur with too high a frequency are less appropriate for distinguishing documents within the set. For example, the term "News" is used in about one third of all documents in a test set of broadcast-related documents, whereas the word "football" is used in only about 2% of documents in the test set. Therefore "football" can be assumed to be a better term for characterising the content of a document than "News". Conversely, the word "fottball" (a misspelling of "football") appears only once in the entire set of documents, and so is discarded for having too low an occurrence. Such words may be defined as those having a frequency of occurrence which is lower than two standard deviations less than the mean frequency of occurrence, or which is higher than two standard deviations above the mean frequency of occurrence.

A feature vector is then generated at a step 130.

Figure 3A:
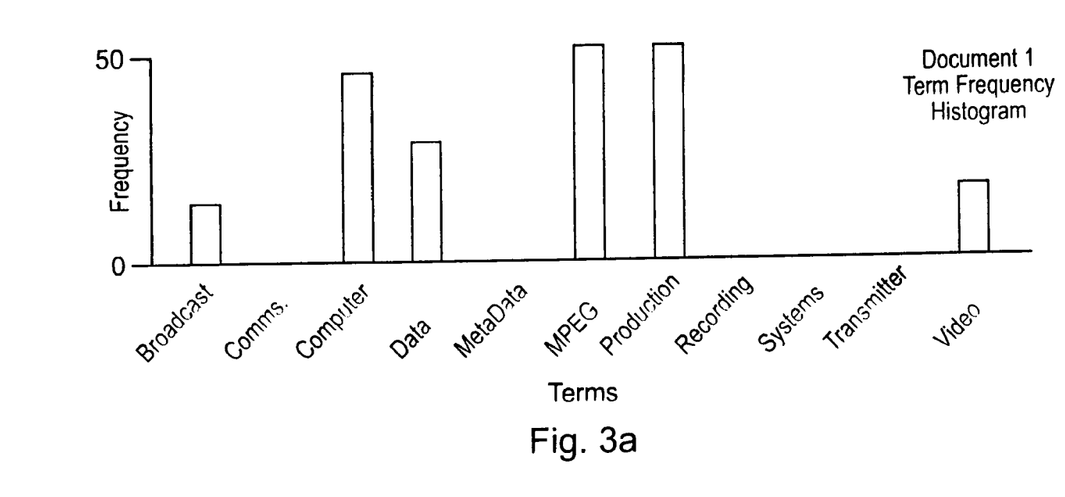
FIGS. 3a and 3b schematically illustrate term frequency histograms.
Figure 3B:
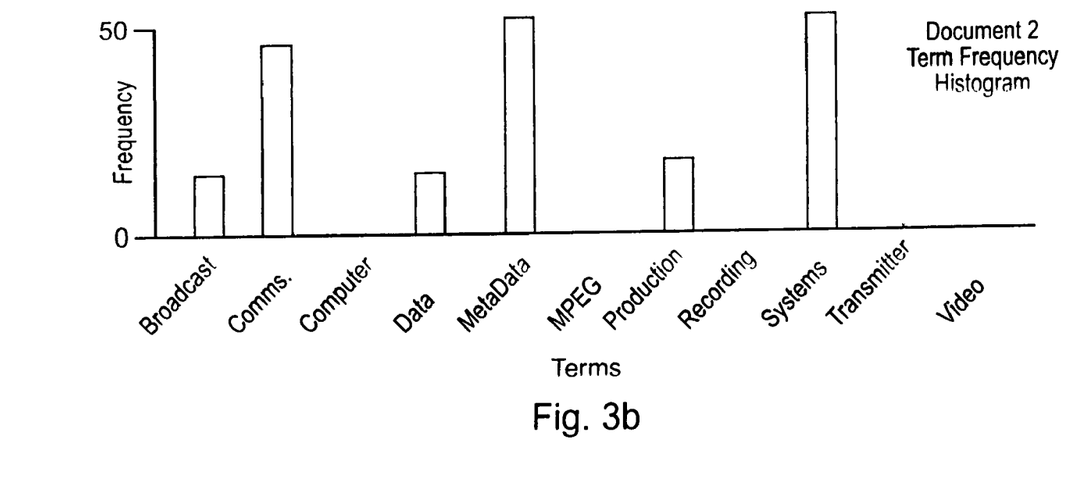
Figure 4A:
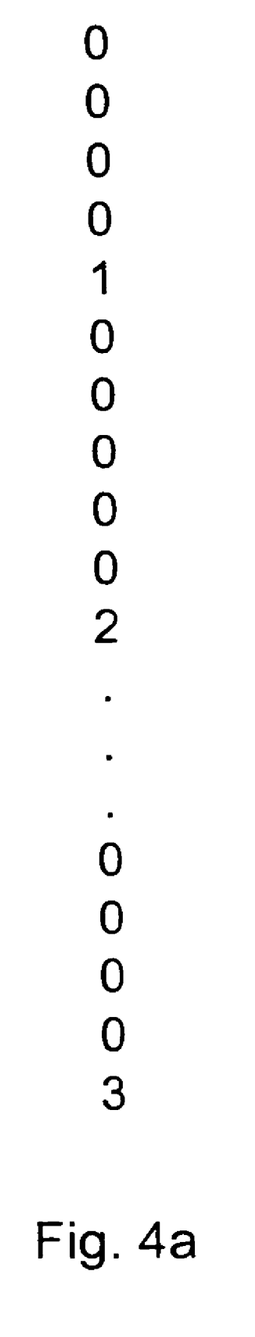
FIG. 4a schematically illustrates a raw feature vector.
Figure 4B:
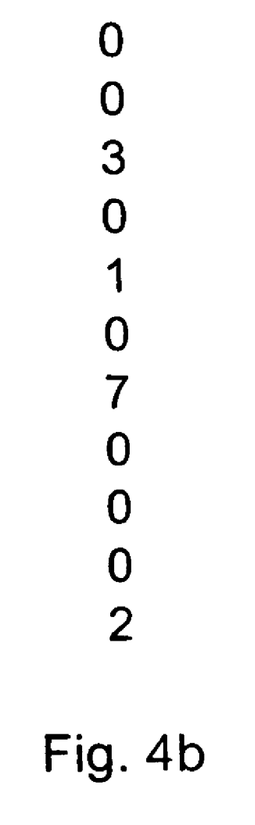
FIG. 4b schematically illustrates a reduced feature vector.

To do this, a term frequency histogram is generated for each document in the set. A term frequency histogram is constructed by counting the number of times words present in the dictionary (pertaining to that document set) occur within an individual document. The majority of the terms in the dictionary will not be present in a single document, and so these terms will have a frequency of zero. Schematic examples of term frequency histograms for two different documents are shown in FIGS. 3a and 3b.

It can be seen from this example how the histograms characterise the content of the documents. By inspecting the examples it is seen that document 1 has more occurrences of the terms "MPEG" and "Video" than document 2, which itself has more occurrences of the term "MetaData". Many of the entries in the histogram are zero as the corresponding words are not present in the document.

In a real example, the actual term frequency histograms have a very much larger number of terms in them than the example. Typically a histogram may plot the frequency of over 50000 different terms, giving the histogram a dimension of over 50000. The dimension of this histogram needs to be reduced considerably if it is to be of use in building an SOM information space.

Each entry in the term frequency histogram is used as a corresponding value in a feature vector representing that document. The result of this process is a (50000×1) vector containing the frequency of all terms specified by the dictionary for each document in the document collection. The vector may be referred to as "sparse" since most of the values will typically be zero, with most of the others typically being a very low number such as 1.

The size of the feature vector, and so the dimension of the term frequency histogram, is reduced at a step 140. Two methods are proposed for the process of reducing the dimension of the histogram.

i) Random Mapping—a technique by which the histogram is multiplied by a matrix of random numbers. This is a computationally cheap process.

ii) Latent Semantic Indexing—a technique whereby the dimension of the histogram is reduced by looking for groups of terms that have a high probability of occurring simultaneously in documents. These groups of words can then be reduced to a single parameter. This is a computationally expensive process.

The method selected for reducing the dimension of the term frequency histogram in the present embodiment is "random mapping", as explained in detail in the Kaski paper referred to above. Random mapping succeeds in reducing the dimension of the histogram by multiplying it by a matrix of random numbers.

As mentioned above, the "raw" feature vector (shown schematically in FIG. 4a) is typically a sparse vector with a size in the region of 50000 values. This can be reduced to size of about 200 (see schematic FIG. 4b) and still preserve the relative characteristics of the feature vector, that is to say, its relationship such as relative angle (vector dot product) with other similarly processed feature vectors. This works because although the number of orthogonal vectors of a particular dimension is limited, the number of nearly orthogonal vectors is very much larger.

In fact as the dimension of the vector increases any given set of randomly generated vectors are nearly orthogonal to each other. This property means that the relative direction of vectors multiplied by this a matrix of random numbers will be preserved. This can be demonstrated by showing the similarity of vectors before and after random mapping by looking at their dot product.

It can be shown experimentally that by reducing a sparse vector from 50000 values to 200 values preserves their relative similarities. However, this mapping is not perfect, but suffices for the purposes of characterising the content of a document in a compact way.

Figure 5:
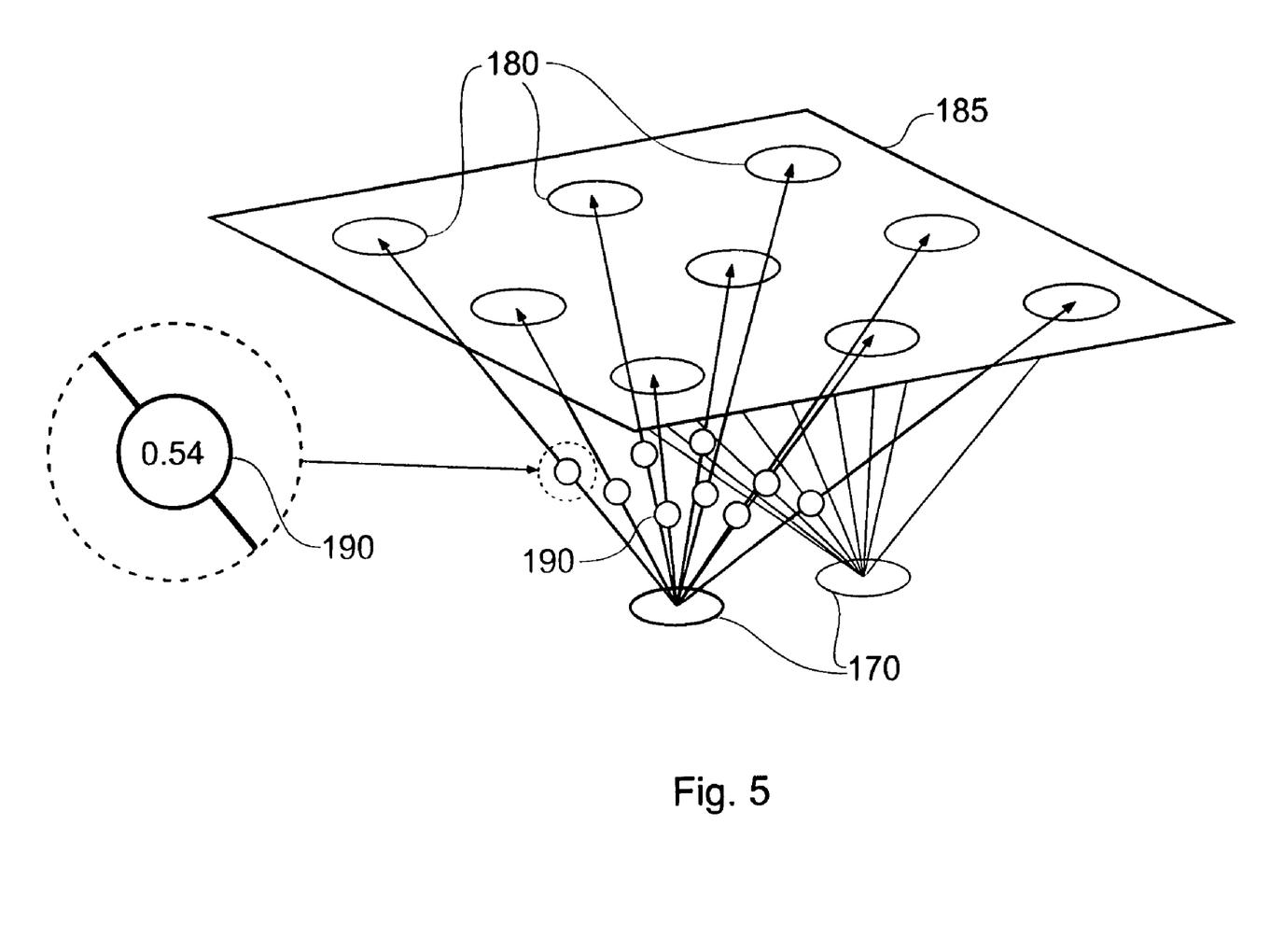
FIG. 5 schematically illustrates an SOM.

Once feature vectors have been generated for the document collection, thus defining the collection's information space, they are projected into a two-dimensional SOM at a step 150 to create a semantic map. The following section explains the process of mapping to 2-D by clustering the feature vectors using a Kohonen self-organising map. Reference is also made to FIG. 5.

A Kohonen Self-Organising map is used to cluster and organise the feature vectors that have been generated for each of the documents.

A self-organising map consists of input nodes 170 and output nodes 180 in a two-dimensional array or grid of nodes illustrated as a two-dimensional plane 185. There are as many input nodes as there are values in the feature vectors being used to train the map. Each of the output nodes on the map is connected to the input nodes by weighted connections 190 (one weight per connection).

Initially each of these weights is set to a random value, and then, through an iterative process, the weights are "trained". The map is trained by presenting each feature vector to the input nodes of the map. The "closest" output node is calculated by computing the Euclidean distance between the input vector and weights of each of the output nodes.

The closest node is designated the "winner" and the weights of this node are trained by slightly changing the values of the weights so that they move "closer" to the input vector. In addition to the winning node, the nodes in the neighbourhood of the winning node are also trained, and moved slightly closer to the input vector.

It is this process of training not just the weights of a single node, but the weights of a region of nodes on the map, that allow the map, once trained, to preserve much of the topology of the input space in the 2-D map of nodes.

Once the map is trained, each of the documents can be presented to the map to see which of the output nodes is closest to the input feature vector for that document. It is unlikely that the weights will be identical to the feature vector, and the Euclidean distance between a feature vector and its nearest node on the map is known as its "quantisation error".

By presenting the feature vector for each document to the map to see where it lies yields an x, y map position for each document. These x, y positions when put in a look up table along with a document ID can be used to visualise the relationship between documents.

Finally, a dither component is added at a step 160, which will be described with reference to FIG. 6 below.

A potential problem with the process described above is that two identical, or substantially identical, information items may be mapped to the same node in the array of nodes of the SOM. This does not cause a difficulty in the handling of the data, but does not help with the visualisation of the data on display screen (to be described below). In particular, when the data is visualised on a display screen, it has been recognised that it would be useful for multiple very similar items to be distinguishable over a single item at a particular node. Therefore, a "dither" component is added to the node position to which each information item is mapped. The dither component is a random addition of ±½ of the node separation. So, referring to FIG. 6, an information item for which the mapping process selects an output node 200 has a dither component added so that it in fact may be mapped to any map position around a node 200 within the area 210 bounded by dotted lines on FIG. 6.

Figure 6:
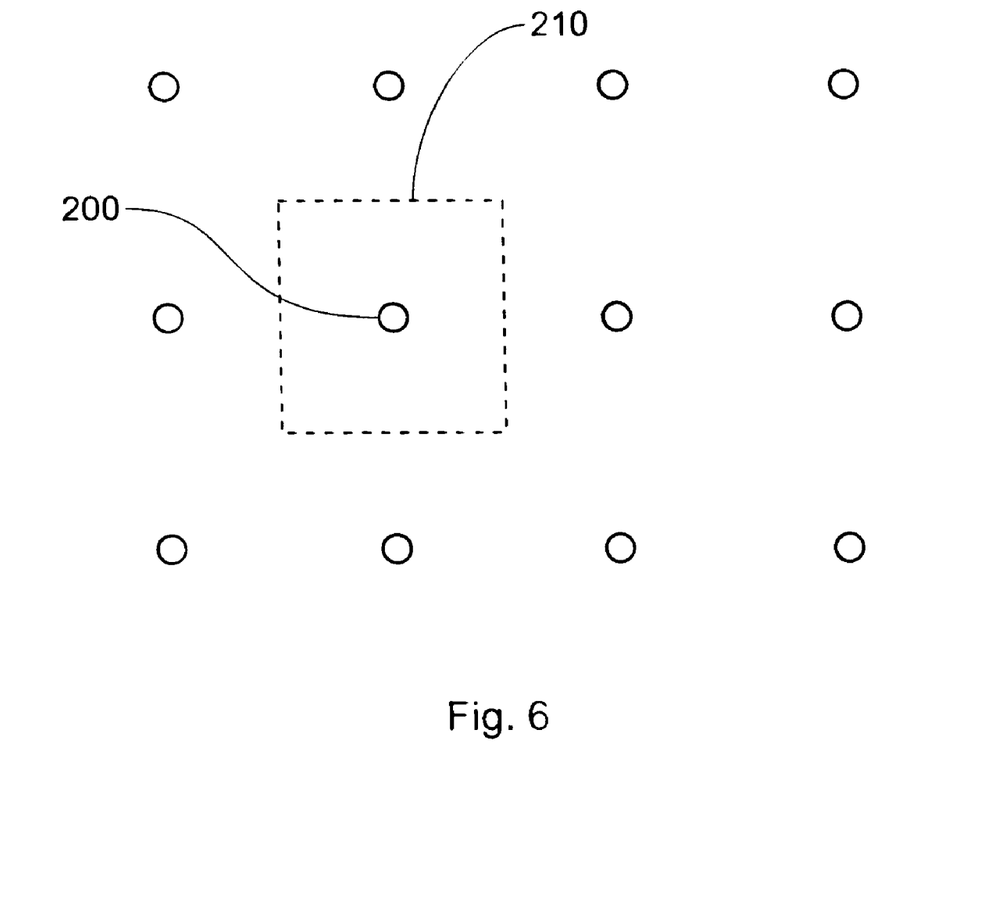
FIG. 6 schematically illustrates a dither process.

So, the information items can be considered to map to positions on the plane of FIG. 6 at node positions other than the "output nodes" of the SOM process.

At any time, a new information item can be added to the SOM by following the steps outlined above (i.e. steps 110 to 140) and then applying the resulting reduced feature vector to the "pre-trained" SOM models, that is to say, the set of SOM models which resulted from the self-organising preparation of the map. So, for the newly added information item, the map is not generally "retrained"; instead steps 150 and 160 are used with all of the SOM models not being amended. To retrain the SOM every time a new information item is to be added is computationally expensive and is also somewhat unfriendly to the user, who might grow used to the relative positions of commonly accessed information items in the map.

However, there may well come a point at which a retraining process is appropriate. For example, if new terms (perhaps new items of news, or a new technical field) have entered into the dictionary since the SOM was first generated, they may not map particularly well to the existing set of output nodes. This can be detected as an increase in a so-called "quantisation error" detected during the mapping of newly received information item to the existing SOM. In the present embodiments, the quantisation error is compared to a threshold error amount. If it is greater than the threshold amount then either (a) the SOM is automatically retrained, using all of its original information items and any items added since its creation; or (b) the user is prompted to initiate a retraining process at a convenient time. The retraining process uses the feature vectors of all of the relevant information items and reapplies the steps 150 and 160 in full.

Figure 7:
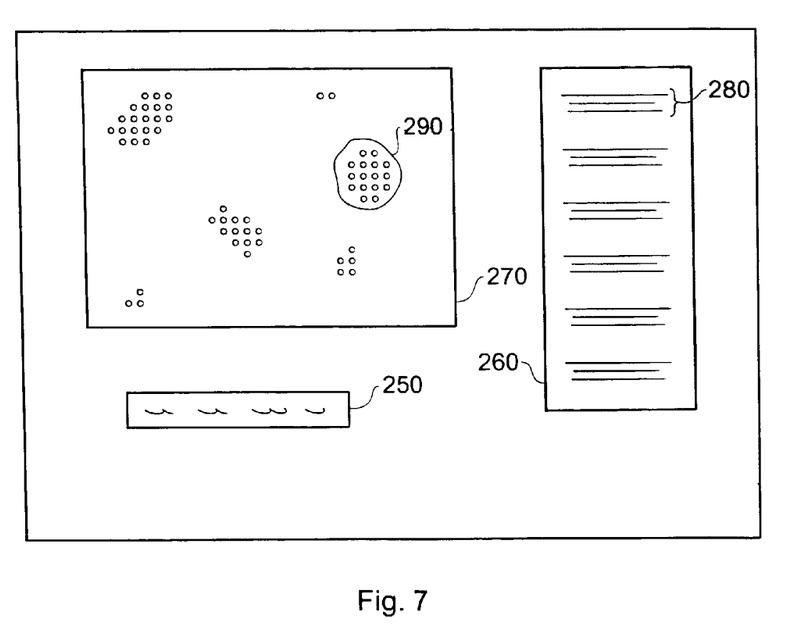
FIGS. 7 and 8 schematically illustrate display screens providing a user interface to access information represented by the SOM.

FIG. 7 schematically illustrates a display on the display screen 60. The display shows a search enquiry 250, a results list 260 and an SOM display area 270.

In operation, initially, the display area 270 is blank. The user types a key word search enquiry into the enquiry area 250. The user then initiates the search, for example by pressing enter on the keyboard 70 or by using the mouse 80 to select a screen "button" to start the search. The key words in the search enquiry area 250 are then compared with the information items in the database using a standard keyword search technique. This generates a list of results, each of which is shown as a respective entry 280 in the list area 260. Then the display area 270 displays display points corresponding to each of the result items.

Because the sorting process used to generate the SOM representation tends to group mutually similar information items together in the SOM, the results for the search enquiry generally tend to fall in clusters such as a cluster 290. Here, it is noted that each point on the area 270 corresponds to the respective entry in the SOM associated with one of the results in the result list 260; and the positions at which the points are displayed within the area 270 correspond to the array positions of those nodes within the node array.

Figure 8:
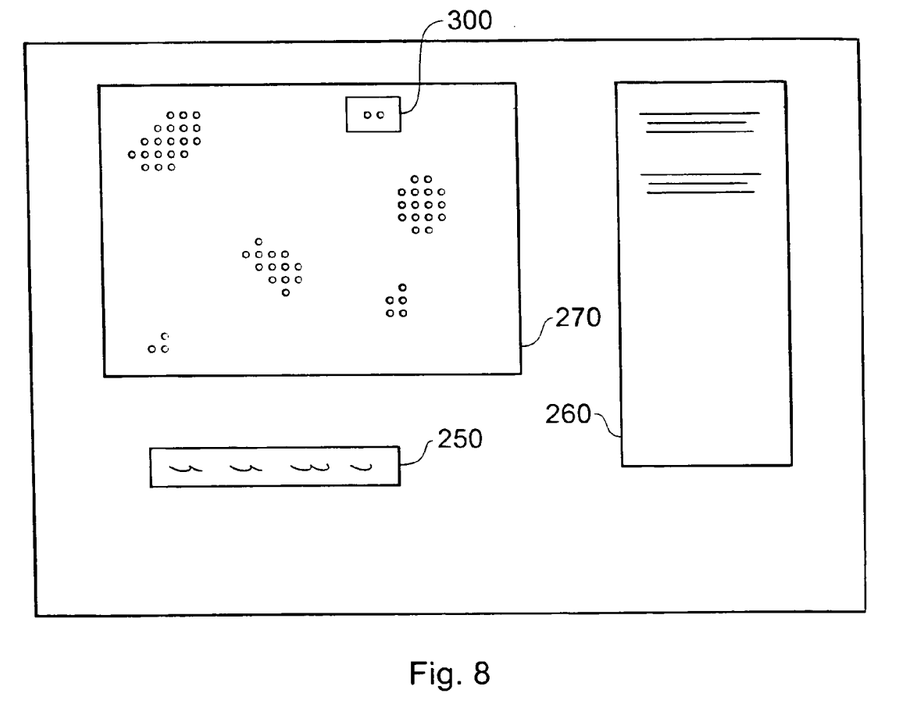

FIG. 8 schematically illustrates a technique for reducing the number of "hits" (results in the result list). The user makes use of the mouse 80 to draw a boundary, which in this example is a rectangular box, 300 around a set of the display points displayed in area 270. In the results list area 260, only those results corresponding to points within the boundary 300 are displayed. If these results turn out not to be of interest, the user may draw another boundary encompassing a different set of display points.

It is noted that the results area 260 displays list entries for those results for which display points are displayed within the boundary 300 and which satisfied the search criteria in the word search area 250. The boundary 300 may encompass other display positions corresponding to populated nodes in the node array, but if these did not satisfy the search criteria they will not be displayed and so will not form part of the subset of results shown in the list 260.

Figure 9:
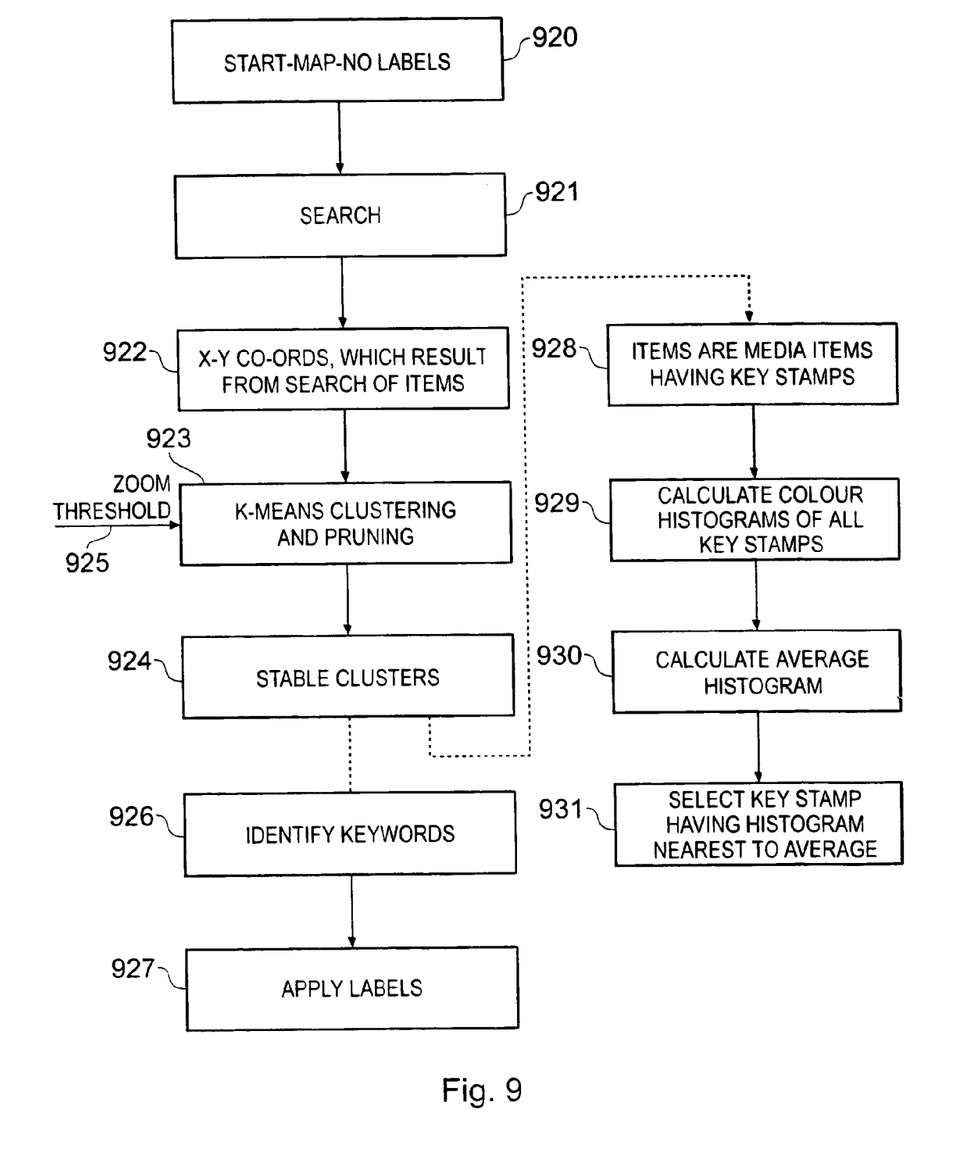
FIG. 9 is a schematic flow diagram illustrating the automatic generation of labels.

FIG. 9 illustrates an embodiment of the present invention. Referring to FIG. 9, step 920, when the Self Organising Map SOM is generated it has no labels, (unlike the SOM of Kohonen). Users require labels to give guidance for exploring the map. In embodiments of the invention the labels are automatically generated to match the particular needs of the users. Users generate a list of results of a search as described with reference to FIG. 7 and/or FIG. 8. A label is automatically dynamically generated according to the results and used to label the clusters of display points in the area 270.

At step 921, a user initiates a searching operation. The search is initiated in this example using a key word search enquiry as describe above with reference to FIG. 7. This results in many result items, for example documents, denoted by individual X-Y positions on the map as indicated by step 922. Steps 921 and 922 are followed by step 923 "k-means clustering and pruning". Step 923 operates on the X-Y positions on the map, corresponding to the set of result items resulting from the search performed in step 921. At step 923, the known process "k-means clustering" identifies groups of result items which denote similar items. The process includes a process (denoted pruning in step 923) of determining whether adjacent sub-clusters of X-Y positions of result items are part of the same main cluster. If the distance between the centres of two sub-clusters is less than a threshold value, then the two sub-clusters are deemed to be part of the same main cluster. The pruning is performed iteratively in known manner until the clustering is stable as indicated at step 924.

In step 926 the items which are in a cluster are identified and the keywords are identified. The top 20 keywords, and their frequency are pre-computed for each of the items. Calculating the cluster labels involves summing totals for all of the keywords that have been pre-computed for each item, and selecting the most frequent. The selected most frequent keyword is applied as the label of a cluster. The pre-computation of keywords significantly reduces the time required to generate a label for a cluster.

If there is only a single item in the cluster then the 'title' of that item is used as the label.

Thus the determination of clusters and the labelling of the clusters is dependent on the search enquiry made by the user.

The threshold, mentioned above, of the distance between sub-clusters may be chosen by the user. Alternatively, the threshold may be dependent on "zoom". A part of the SOM may be viewed on an enlarged scale. When the map is viewed on a small scale, adjacent sub-clusters form one larger cluster yet when viewed on an enlarged scale they are separate. Thus the threshold is made dependent on the zoom factor.

The items may be documents, images or video. If the items are media items such as images or video the keywords may be keywords used in metadata relating to the images or video. Titles are an example of metadata. Other examples of metadata are known in the art.

It is known to provide Representative Key Stamps (RKS) representing media items such as video. In accordance with another embodiment of the invention, a search is performed according to FIG. 7 or FIGS. 7 and 8 and steps 920 to 924 as described above to produce a results list, corresponding display points in the display area 270, and to identify stable clusters. As shown in steps 928 to 931 an RKS is selected as a label for a cluster 290. By way of example, in one embodiment of the invention, at step 928, the RKSs of the media items of a cluster 290 are obtained, and at step 929, colour histograms of all those RKSs are calculated. At step 930, the average colour histogram is calculated, and at step 931, the RKS having a colour histogram which most closely matches the average histogram is selected. The average RKS is a representation of the cluster. In this way, clusters may be labelled with RKSs representative of the clusters. Individual RKSs represent individual media items in the or each cluster.

A heirarchy of RKSs may be provided in which an RKS is chosen to represent a whole results list, an RKS is chosen to represent each cluster, and individual RKSs represent individual media items in the results list.

An RKS of a single media item may be chosen in any known way. One example is as follows:

i) For determining an RKS for a single media item, metrics can be calculated for each frame in the item to determine whether there are faces in the image, who the face belongs to and whether there is speech in the audio. The representative frame can then be selected as being a frame containing the face of the individual featured most within the media item, that also contains speech. For instance the media item 'Parkinson' (a television presenter well known in the UK) would favour a frame containing Parkinson speaking to camera over frames of his guests.

An RKS of a group of media items (e.g. a list or a cluster) may be chosen any known way. Some examples are as follows:

ii) For determining an RKS for a group of media items, one can take all the frames in all the media items and process them in the same way as we do in(i). For example, if we have 10×5 minute items, we process this as in (i) as if it were a single 50 minute item.

iii) Alternatively for a group of media items, one can determine the RKS for each individual item as in (i). Next we assume that our search result list includes some relevancy metric, which ranks each result according to its relevancy to the search query. The RKS for the group of media items can now be determined as being the same as the RKS of the most relevant item in the group of media items.

iv) As an extension to (iii), any method used to rank search results can be used to determine the highest ranked hit in any cluster of results, and simply using the RKS of that item to represent the group.

v) Simple methods for obtaining an RKS include: automatically selecting a frame at random from the set of all frames that make up all the media items in the group; simply automatically selecting the frame, from the group of items, that happens to be to processed first; and the user choosing a frame they think is most representative.

Figure 10:
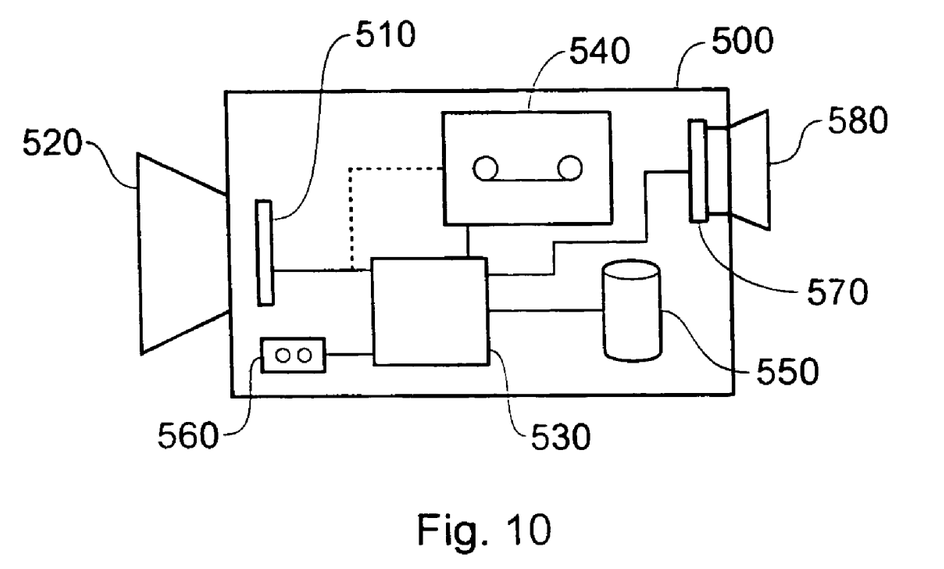
FIG. 10 schematically illustrates a camcorder as an example of a video acquisition and/or processing apparatus.

FIG. 10 schematically illustrates a camcorder 500 as an example of a video acquisition and/or processing apparatus, the camcorder including an image capture device 510 with an associated lens 520; a data/signal processor 530; tape storage 540; disk or other random access storage 550; user controls 560; and a display device 570 with eyepiece 580. Other features of conventional camcorders or other alternatives (such as different storage media or different display screen arrangements) will be apparent to the skilled man. In use, MetaData relating to captured video material may be stored on the storage 550, and an SOM relating to the stored data viewed on the display device 570 and controlled as described above using the user controls 560.

Figure 11:
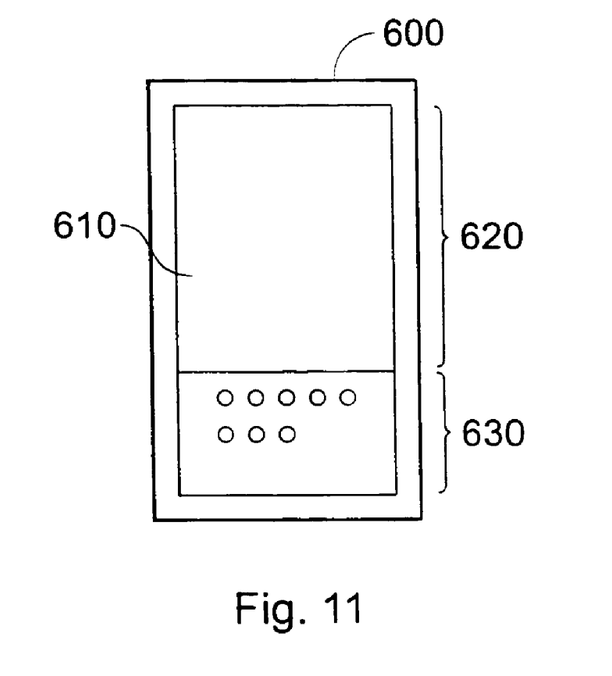
FIG. 11 schematically illustrates a personal digital assistant as an example of portable data processing apparatus.

FIG. 11 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in connection with the system of FIG. 1.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An information retrieval system in which a set of distinct information items map to respective nodes in a self-organizing map by mutual similarity of the information items, so that similar information items map to nodes at similar positions in the self-organizing map, wherein the self-organizing map is trained upon reduced dimension characterizations of the information items, the system comprising:
   a user control configured to define a search criterion for selecting a subset of the information items represented by the self-organizing map, the search criterion being applied using a standard keyword search technique;
   a detector configured to detect those positions within the self-organizing map corresponding to the subset of the information items selected by the standard keyword search technique;
   a graphical user interface configured to display points representing only those positions within the self-organizing map corresponding to the selected subset of information items; and
   a processor, responsive to the selected subset of information items selected using the search criterion, configured to provide one or more representations representative of the information content of the selected subset of information items,
   wherein each of the information items represented by the self-organizing map includes image data; and
   wherein the processor is responsive to the selected subset of information items and causes the graphical user interface to display one or more images obtained from the image data included in the selected subset of information items selected using the search criterion so as to represent the content of the selected subset of information items.

2. A system according to claim 1, wherein the graphical user interface is configured to display a two-dimensional display array of the said display points.

3. A system according to claim 2, in which a dither component is applied to the mapping between information items and nodes in the self-organizing map so that information items that share a node tend to map to closely spaced, but different positions in the displayed array.

4. A system according to claim 2, in which the information items are mapped to nodes in the self-organizing map on the basis of a feature vector derived from each information item.

5. A system according to claim 4, in which the feature vector for an information item represents a set of frequencies of occurrence, within that information item, of each of a group of information features.

6. A system according to claim 5, in which the information items comprise textual information, the feature vector for an information item represents a set of frequencies of occurrence, within that information item, of each of a group of words.

7. A system according to claim 1, in which the information items comprise textual information, the nodes being mapped by mutual similarity of at least a part of the textual information.

8. A system according to claim 6, in which the information items are pre-processed for mapping by excluding words occurring with more than a threshold frequency amongst the set of information items.

9. A system according to claim 6, in which the information items are pre-processed for mapping by excluding words occurring with less than a threshold frequency amongst the set of information items.

10. A system according to claim 1, wherein the said user control comprises:
    search means for carrying out a search of the information items represented by the self-organizing map;
    the search means and the graphical user interface being configured to co-operate so that only those display points corresponding to the subset of information items selected by the search means are displayed on a user display.

11. A system according to claim 1, wherein the said processor is configured to detect clusters of similar information items and to provide representations representative of the information content of the respective clusters.

12. A system according to claim 1, wherein the processor is configured to provide each representation on a user display as a label of the display points corresponding to the information items represented thereby.

13. A system according to claim 12, wherein the label is a word or set of words.

14. A system according to claim 11, wherein the processor determines, in respect of a set of information items with which a label is to be associated, the most frequently used word or set of words in the information items corresponding to the selected subset of the information items and applies that word or that set of words as the label.

15. A system according to claim 1, wherein the said processor is configured to select, from the image data, an image which is representative of the image data as a whole according to a predetermined selection criterion.

16. A system according to claim 1, wherein the processor is configured to select an image, a property of which is nearest to the average of a same property of the image data.

17. A system according to claim 1, wherein the said one or more images are applied as labels to the display points corresponding to the information items represented thereby.

18. A portable data processing device comprising a system according to claim 1.

19. Video acquisition and/or processing apparatus comprising a system according to claim 1.

20. An information retrieval method in which a set of distinct information items map to respective nodes in a self-organizing map by mutual similarity of the information items, so that similar information items map to nodes at similar positions in the self-organizing map, wherein the self-organizing map is trained upon reduced dimension characterizations of the information items, the method comprising:

defining a search criterion for selecting a subset of the information items represented by the self-organizing map, the search criterion being applied using a standard keyword search technique;

detecting those positions within the self-organizing map corresponding to the subset of the information items selected by the standard keyword search technique;

displaying display points which are at positions representing only those positions within the self-organizing map corresponding to the selected subset of information items; and in response to the selected subset of information items selected using the search criterion, providing one or more representations representative of the information content of the selected subset of information items, wherein each of the information items represented by the self-organizing map includes image data; and wherein the providing step includes displaying one or more images obtained from the image data included in the selected subset of information items selected using the search criterion so as to represent the content of the selected subset of information items.

21. A method according to claim 20, wherein the displaying step displays a two-dimensional display array of the said display points.

22. A method according to claim 20, comprising:
carrying out a search of the information items;
displaying on a user display only those display points corresponding to the subset of information items selected by the search.

23. A method according to claim 20, further comprising detecting clusters of similar information items and providing representations representative of the information content of the respective clusters.

24. A method according to claim 20, further comprising providing each representation on a user display as a label of the display points corresponding to the information items represented thereby.

25. A method according to claim 24, wherein the label is a word or set of words.

26. A method according to claim 20, further comprising providing the one or more images representative of the information content of the selected subset of information items selected using the search criterion.

27. A method according to claim 26, further comprising selecting, from the image data, an image which is representative of the image data as a whole according to a predetermined selection criterion.

28. A method according to claim 27, further comprising selecting the image, a property of which is nearest to the average of the same property of said image data.

29. A computer-readable medium storing a program which, when executed by a computer, causes the computer to perform the method recited in claim 20.

30. A computer-readable medium storing a program that, when executed by a computer, causes the computer to generate a user interface of an information retrieval system in which a set of distinct information items map to respective nodes a self-organizing map by mutual similarity of the information items, so that similar information items map to nodes at similar positions in the self-organizing map, wherein the self-organizing map is trained upon reduced dimension characterizations of the information items, the interface comprising:

a user control for defining a search criterion for selecting a subset of the information items represented by the self-organizing map, the search criterion being applied using a standard keyword search technique; and a graphical user interface configured to display points representing only those positions within the self-organizing map corresponding to the subset of information items selected by the standard keyword search technique and to display one or more representations representative of the information content of the subset of information items selected by the search criterion, wherein each of the information items represented by the self-organizing maps includes image data; and wherein the graphical user interface is configured to display one or more images obtained from the image data included in the selected subset of information items selected using the search criterion so as to represent the content of the selected subset of information items.

31. A user interface according to claim 30, wherein the said user control comprises:

search means for carrying out a search of the information items represented by the self-organizing map;

the search means and the graphical user interface being configured to co-operate so that only those display points corresponding to the subset of information items selected by the search are displayed on the user display.

32. An interface according to claim 30, wherein the graphical user interface is configured to display representations representative of the information content of respective clusters of similar information items.

33. An interface according to claim 30, wherein graphical user interface is configured to provide each representation as a label of the display points corresponding to the information items represented thereby.

34. An interface according to claim 33, wherein the label is a word or set of words.

35. An interface according to claim 30, wherein the said representations are images that are applied as labels to the display points corresponding to the information items represented thereby.

* * * * *